United States Patent
Enomoto

(10) Patent No.: US 7,652,777 B2
(45) Date of Patent: Jan. 26, 2010

(54) METHOD IN A COPYING APPARATUS FOR CONTROLLING IMAGE ORIENTATION OF A DOCUMENT

(75) Inventor: Katsunori Enomoto, Toyokawa (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 925 days.

(21) Appl. No.: 10/820,704

(22) Filed: Apr. 9, 2004

(65) Prior Publication Data

US 2005/0225803 A1  Oct. 13, 2005

(51) Int. Cl.
 *G06K 15/00* (2006.01)
(52) U.S. Cl. ............... 358/1.12; 358/1.16; 358/488; 358/498
(58) Field of Classification Search .......... 382/297; 399/32; 358/488, 1.15, 1.12, 1.16, 498
See application file for complete search history.

(56) References Cited

U.S. PATENT DOCUMENTS

| | | | | |
|---|---|---|---|---|
| 5,508,810 A | * | 4/1996 | Sato | 358/448 |
| 5,550,623 A | * | 8/1996 | Tomita et al. | 399/83 |
| 5,649,033 A | * | 7/1997 | Morikawa et al. | 382/297 |
| 5,978,614 A | * | 11/1999 | Takeuchi | 399/32 |
| 6,144,777 A | * | 11/2000 | Tada et al. | 382/297 |
| 6,173,088 B1 | * | 1/2001 | Koh et al. | 358/488 |
| 6,646,768 B1 | * | 11/2003 | Andersen et al. | 358/488 |
| 7,002,700 B1 | * | 2/2006 | Motamed | 358/1.15 |
| 7,139,108 B2 | * | 11/2006 | Andersen et al. | 358/488 |
| 7,161,714 B1 | * | 1/2007 | Namizuka et al. | 358/3.07 |
| 2001/0026379 A1 | * | 10/2001 | Collard et al. | 358/488 |
| 2004/0179247 A1 | * | 9/2004 | Yamaguchi et al. | 358/474 |

FOREIGN PATENT DOCUMENTS

JP    A 10-268711    10/1998

* cited by examiner

*Primary Examiner*—Twyler L Haskins
*Assistant Examiner*—Nicholas C Pachol
(74) *Attorney, Agent, or Firm*—Oliff & Berridge, PLC

(57) ABSTRACT

A copying apparatus includes first and second original placement sections with a predetermined orientation of long and short sides of the original to be placed, an image read section for reading the image from the original that has been transported from the first original placement section while the image read section is stationary or from the original that has been placed on the second original placement section while the image read section is moved relative to the original. The copying apparatus causes an image formation section to form the images of a plurality of originals read by the image read section on one side of one recording medium in a predetermined layout based on a detection result of a detection section and a specification of an image orientation specifying section.

32 Claims, 15 Drawing Sheets

| PAGE COUNTER | POSITION |
|---|---|
| 1 | UPPER-LEFT |
| 2 | UPPER-RIGHT |
| 3 | LOWER-LEFT |
| 4 | LOWER-RIGHT |

| PAGE COUNTER | POSITION |
|---|---|
| 1 | UPPER-RIGHT |
| 2 | UPPER-LEFT |
| 3 | LOWER-RIGHT |
| 4 | LOWER-LEFT |

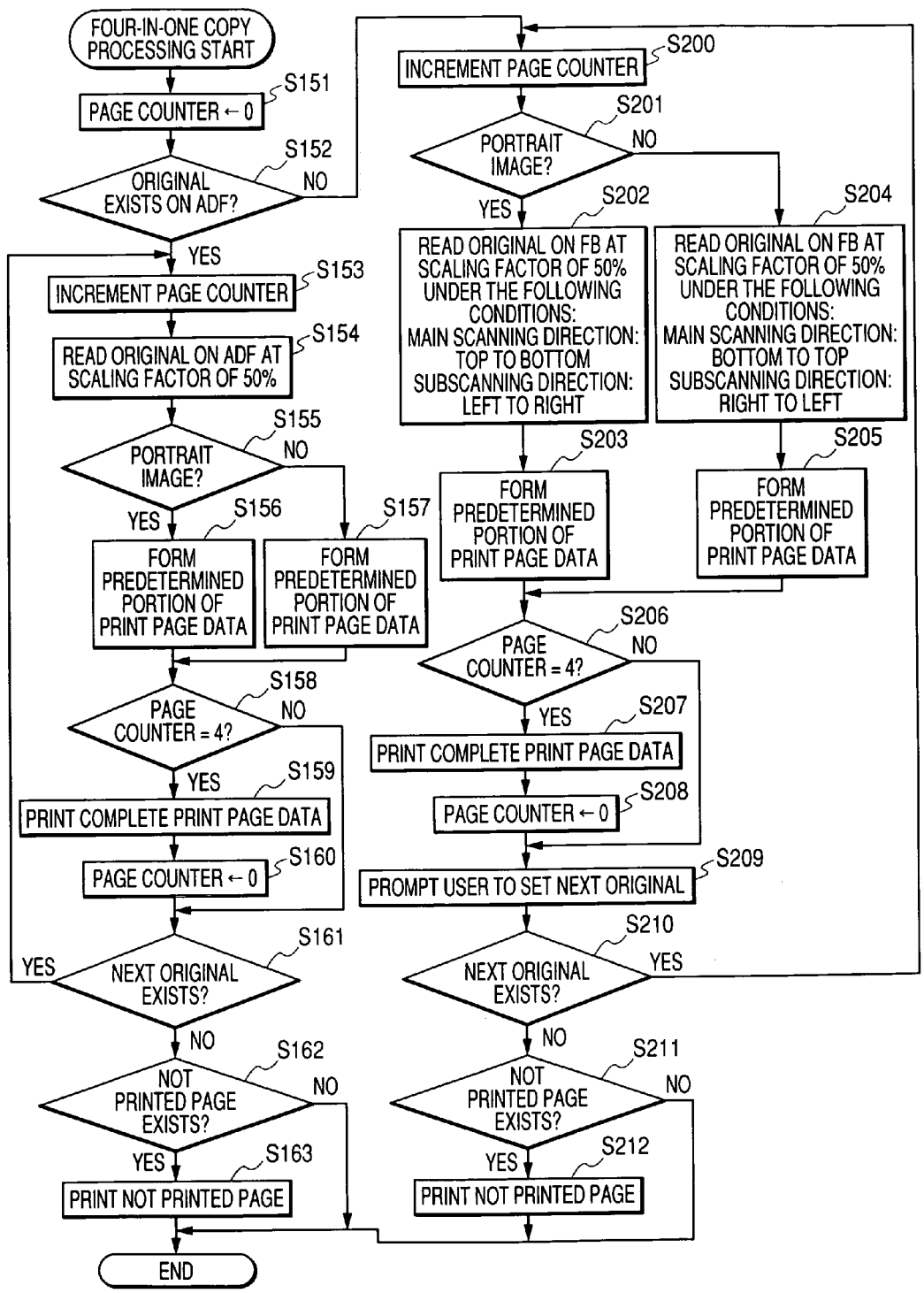

METHOD IN A COPYING APPARATUS FOR CONTROLLING IMAGE ORIENTATION OF A DOCUMENT

BACKGROUND OF THE INVENTION

1. Field of the Invention

This invention relates to a copying apparatus.

2. Description of the Related Art

Hitherto, a copying apparatus including an automatic document feeder has been known. A copying apparatus having a function of copying images of two originals to the same side of one sheet of copy paper or a function of copying images of four originals to the same side of one sheet of copy paper has also been known.

JP-A-10-268711 discloses an art in which an original setting method is displayed on a display section in the case where images of four originals fed by an automatic document feeder are copied to the same side of one sheet of copy paper. The display section displays messages for prompting a user to enter a plurality of conditions and displays the manner in which the user should place originals correctly. The user sets the originals on the automatic document feeder as instructed on the display section.

SUMMARY OF THE INVENTION

To make any desired copy with the copying apparatus described in JP-A-10-268711, the user must enter a plurality of conditions and then understand the correct manner of placing the originals displayed on the display section, which are troublesome to the user.

It is an object of the invention to provide a copying apparatus, which is easier to operate.

According to one aspect of the invention, there is provided a copying apparatus for copying an image read from an original having a long side and a short side to a recording medium, the copying apparatus including:

a first original placement section with a predetermined orientation of the long and short sides of the original to be placed;

a second original placement section with a predetermined orientation of the long and short sides of the original to be placed;

a feeder that transports the original from the first original placement section;

an image read section that reads the image from the original that has been transported from the first original placement section while the image read section is stationary or from the original that has been placed on the second original placement section while the image read section is moved relative to the original;

a storage section that stores data of the image read by the image read section;

a detection section that detects which of the first and second original placement sections the original is placed in;

an image orientation specifying section that specifies whether the top and bottom orientation of the image of the original placed in the first or second original placement section is in parallel with the long side of the original or in parallel with the short side of the original;

an image formation section that forms the image on the recording medium; and a control section that causes the image formation section to form the images of a plurality of originals read by the image read section on one side of one recording medium in a predetermined layout based on the detection result of the detection section and the specification of the image orientation specifying section.

BRIEF DESCRIPTION OF THE DRAWINGS

These and other objects and advantages of this invention will become more fully apparent from the following detailed description taken with the accompanying drawings in which:

FIG. 16 is a flowchart showing a modification of the four-in-one copy processing.

DETAILED DESCRIPTION OF THE PREFERRED EMBODIMENTS

Figure 1:
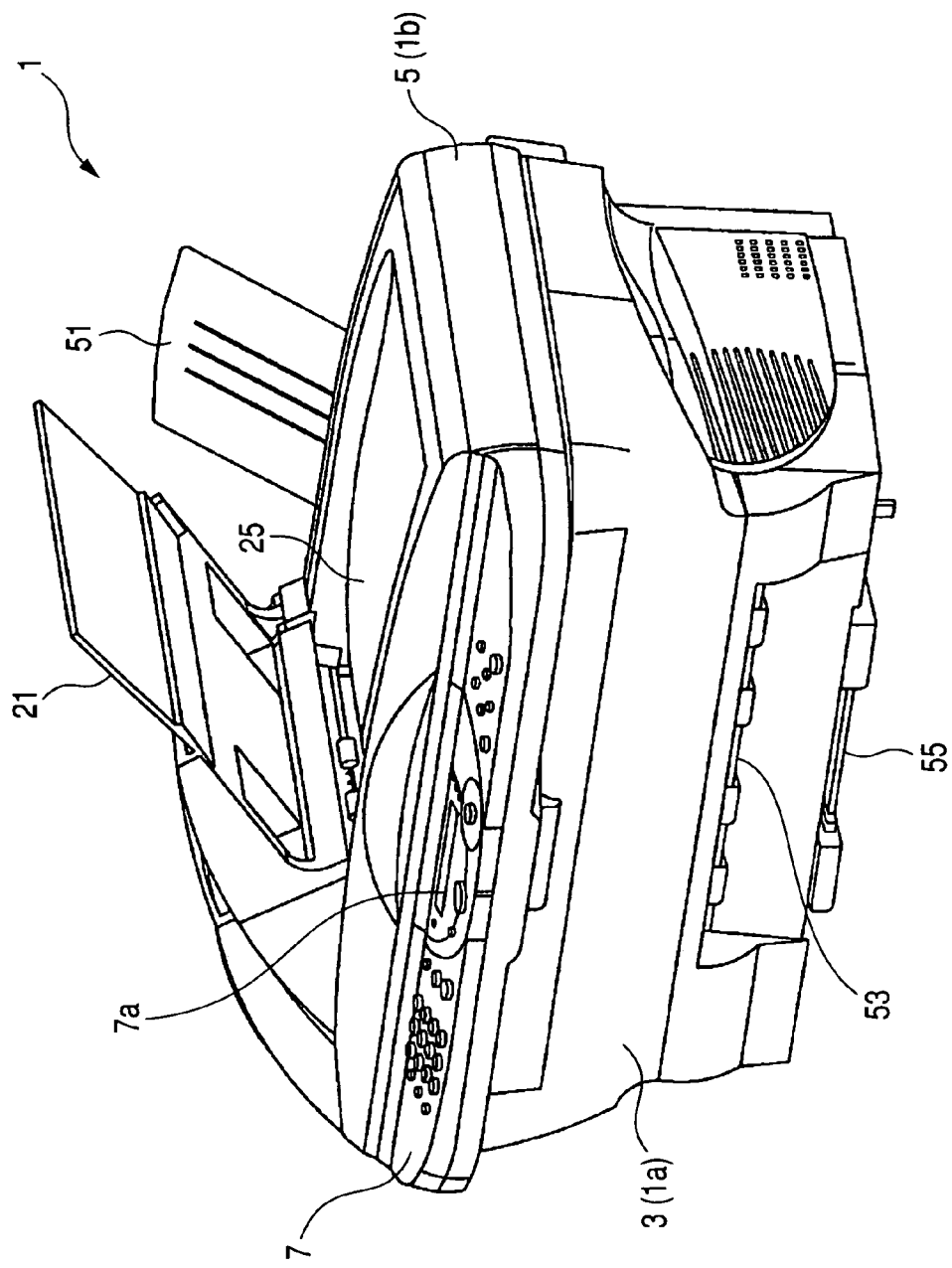
FIG. 1 is a perspective view showing a multi function machine incorporating a copying apparatus.

In some small-sized copying apparatuses, the placement orientation of a rectangular original is predetermined. For example, there is a copying apparatus with the size of a flat bed (FB) being almost the same as the size of A4 paper or the legal size. In this copying apparatus, the orientation of placing an original on the FB and an automatic document feeder (ADF) is predetermined. This copying apparatus requires a small installation space.

With such a copying apparatus, an original is placed on the FB or the ADF so that the orientation of the long side of the original becomes parallel with the orientation of the long side of the FB regardless of whether the top and bottom orientation of the image of the original is parallel with the orientation of the long side of the original (the original image is a portrait image) or the orientation of the short side of the original (the original image is a landscape image). In this regard, the top and bottom orientation of the image of the original relative to the FB and the ADF is not determined.

To copy images of two originals to the same side of one recording medium (two-in-one copy) or to copy images of four originals to the same side of one recording medium (four-in-one copy), it is possible for the copying apparatus to determine whether the original image is a portrait image or a landscape image and then display the correct manner of placing the originals (the correct top and bottom orientation of the images of the originals relative to the FB or the ADF) on a display section.

However, a copying apparatus according to one aspect of the invention does not display the correct manner of placing the originals on a display section, since it is troublesome for a user to operate the copying apparatus if the user needs to understand the correct manner of placing the originals displayed on the display section. An easier-to-operate copying apparatus is provided by not displaying the correct manner of placing the originals on the display section.

Even if the correct top and bottom orientation of the image of the original relative to the FB or the ADF is not displayed on the display section in a situation where the orientation of the long side of the original to be placed on the FB or the ADF is predetermined, it is expected that the user places the original on the FB or the ADF in a constant orientation in most cases.

This copying apparatus according to one aspect of the invention eliminates the need for the user to see the display section to check the correct manner of placing the originals, so that a two-in-one copy or a four-in-one copy can be made easily and rapidly. If the user sets originals in a natural sense, the two-in-one copy or the four-in-one copy is made appropriately, so that the user does not worry over how to place the originals.

Hitherto, this type of copying apparatus has not been available. That is, there has not been proposed a copying apparatus including a first original placement section with a predetermined orientation of the long and short sides of the original to be placed, in which the placed original is transported to the image read position by an ADF, and a second original placement section (FB) with a predetermined orientation of the long and short sides of the original to be placed, in which the placed original is not transported by the ADF, wherein the copying apparatus enables the user to appropriately make the two-in-one copy or the four-in-one copy without forcing the user to check whether or not the top and bottom orientation of the original image is correct regardless of which of the first and second original placement sections the original is placed in.

As the image orientation specifying section, a device that enables the user to specify whether the original image is a portrait image or a landscape image can be exemplified, but the image orientation specifying section is not limited to it.

For example, an image orientation specifying section may be used, in which the original image is read by an image read section and whether the original image is a portrait image or a landscape image is determined with an OCR, etc.

As the image read section, a device having a color image read mode and a monochrome image read mode can be exemplified, but the image read section is not limited to it.

An ink jet printer or a laser printer can be exemplified as the image formation section, but the image formation section is not limited to it.

Paper can be exemplified as the recording medium, but the recording medium is not limited to it. The recording medium may be a sheet-like recording medium such as a film.

A book or the like with record media bound at one end can be exemplified as the record media placed on the FB. The FB enables the user to easily make the two-in-one copy or the four-in-one copy of a book having a predetermined thickness and requiring that the pages be turned to cause the image reader to read a plurality of images.

An embodiment of the invention will be described.

A copying apparatus according to an embodiment of the invention is incorporated in a multi function machine including the functions of an image scanner, printer, copier, and facsimile. FIG. 1 is a perspective view of a multi function machine 1.

The multi function machine 1 includes a clamshell type open/close structure in which an upper main body 1b is attached to a lower main body 1a in such a manner that it can be opened and closed. The multi function machine 1 includes an image formation apparatus 3 (in this embodiment, an inkjet printer) incorporated in the lower main body 1a and an image reader 5 incorporated in the upper main body 1b. An operation panel 7 is provided on the front of the upper main body 1b. A display section 7a is provided on the operation panel 7.

The image reader 5 is a reader having both an FB and an ADF. The image reader 5 also includes a clamshell type open/close structure in which a cover section 5b is attached to a flatbed section 5a in such a manner that the cover section 5b can be opened and closed.

Figure 2:
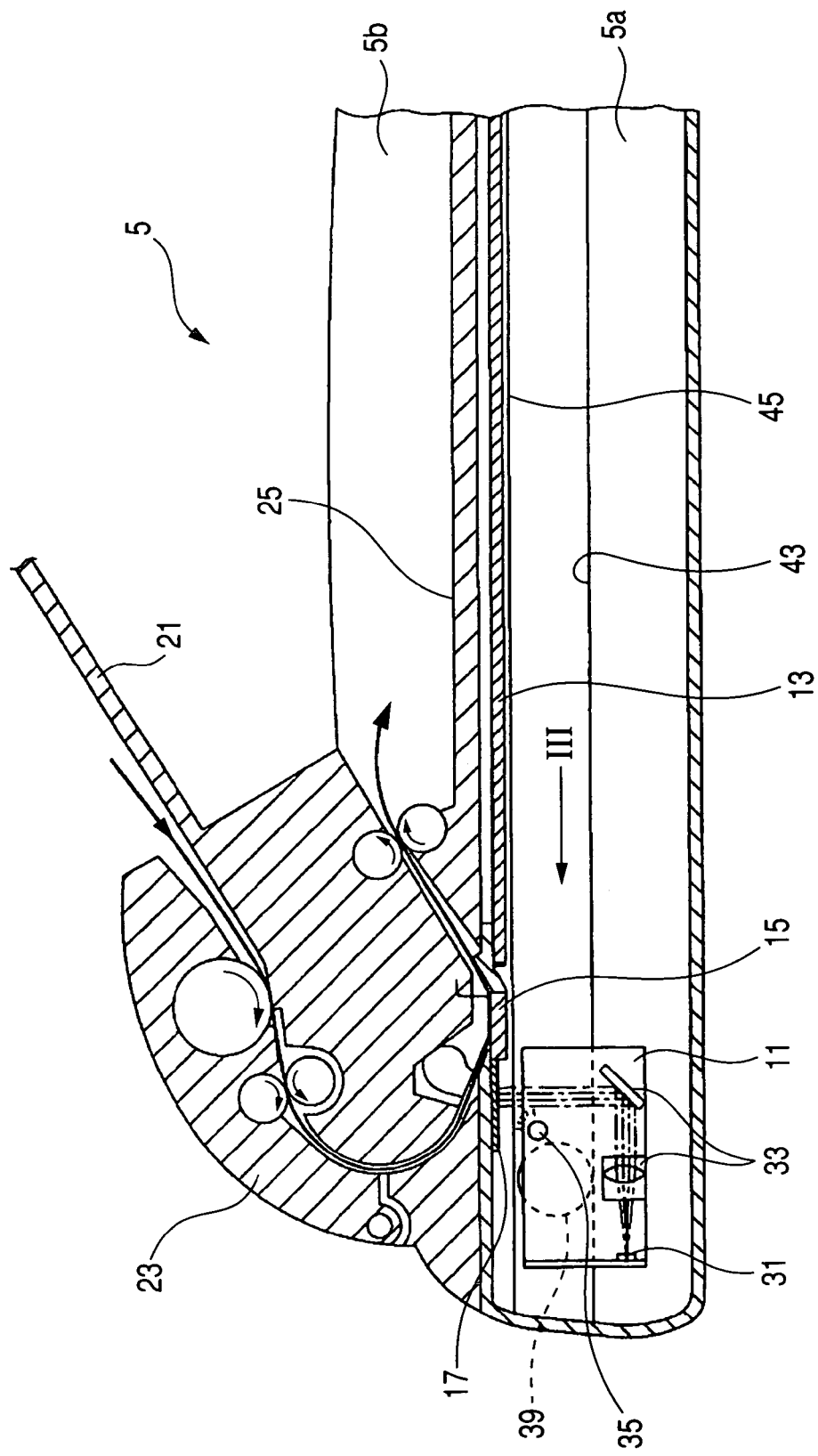
FIG. 2 is a longitudinal sectional view showing an image reader.

In the image reader 5, a read head 11, a first platen glass 13, a second platen glass 15, a white board 17, and the like are disposed in the flatbed section 5a, and an original supply tray 21, an original transporter 23, an original ejection tray 25, and the like are provided on the cover section 5b, as shown in FIG. 2.

The read head 11 includes an image sensor 31, an optical device group 33 made up of lens and mirrors, and a light source 35. The read head 11 is configured so that the light source 34 applies light to an original existing at a read target position, the optical device group 33 gathers reflected light from the original on the image sensor 31, and the image sensor 31 reads an image.

Figure 3:
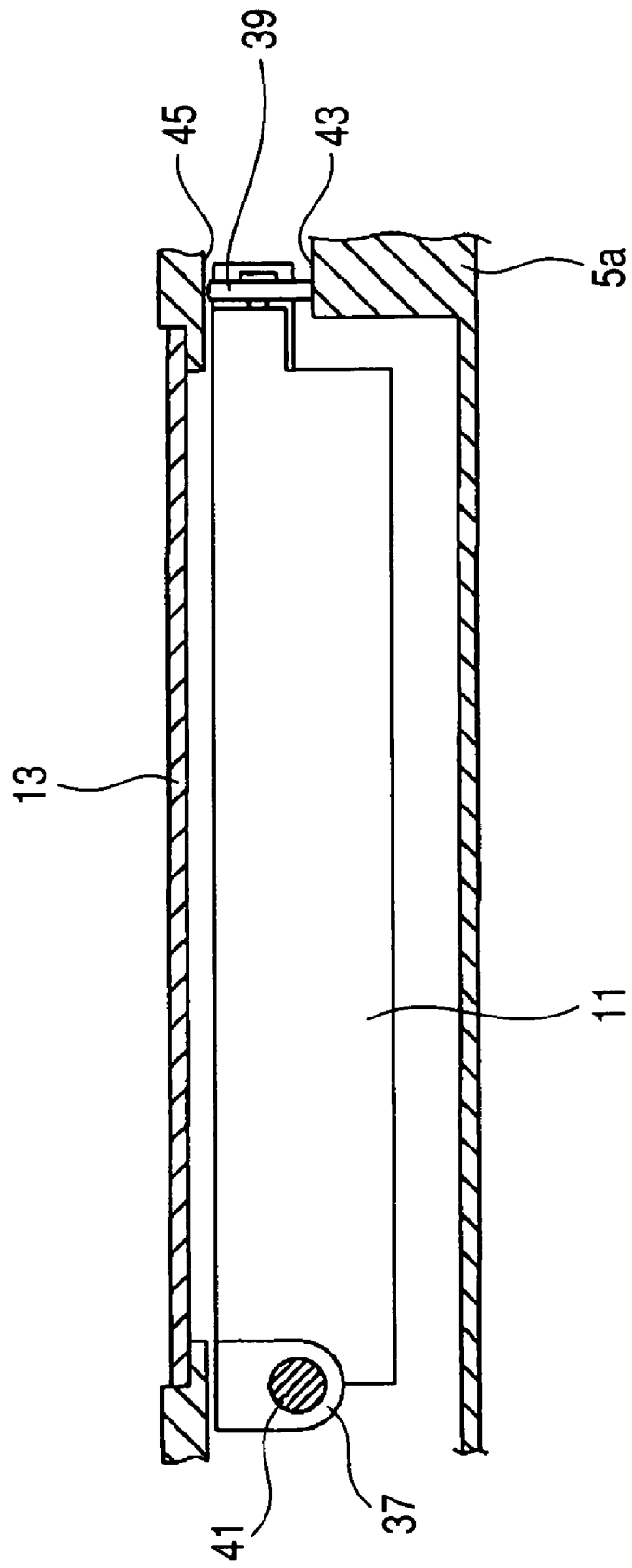
FIG. 3 is a longitudinal sectional view showing a read head and its periphery viewed from arrow III direction in FIG. 2.

The read head 11 includes a bearing 37 at one end and a roller 39 at the other end, as shown in FIG. 3. A guide bar 41 disposed in parallel with the first platen glass 13, the second platen glass 15, and the white board 17 in the flatbed section 5a is inserted into the bearing 37 and the roller 39 is placed on the top of a guide face 43, whereby the read head 11 is placed between the guide bar 41 and the guide face 43 and reciprocates along the guide bar 41. A part of the upper end of the roller 39 projects above the read head 11, as shown in FIG. 2. A guide section 45 is formed at a position producing a slight gap (in this embodiment, a gap of about 0.5 mm) with the roller 39. As such a structure is adopted, if a force acts on the read head 11 so as to rotate the read head 11 on the guide bar 41 due to vibration, etc., occurring when the multi function machine 1 is transported, the roller 39 first abuts the guide section 45. Accordingly, rotation of the read head 11 is regulated, so that the main body of the read head 11 is prevented from coming into collision with the first platen glass 13, the second platen glass 15, and the white board 17.

The first platen glass 13 is used to read an image from an original on the FB. To read the image from the original using the FB, the user places the original on the first platen glass 13, presses the original against the first platen glass 13 in the cover section 5b, and in this state, performs predetermined operation on the operation panel 7 (for example, presses a read start button), whereby the image reader 5 reads the image from the original while moving the read head 11 along the first platen glass 13.

The second platen glass 15 is used to read an image from an original fed from the ADF. To read the image from the original using the ADF, the user sets the original on the original supply tray 21 and in this state, performs predetermined operation on the operation panel 7 (for example, presses the read start button), whereby the image reader 5 operates the original transporter 23 to transport the original from the original supply tray 21 to the original ejection tray 25, and reads the image from the original passing through the top of the second platen glass 15 with the read head 11 made still below the second platen glass 15.

The white board 17 is a member having a uniform density distribution of white. An image is read from the white board 17 and white level correction data required for converting the measurement data into ideal data is acquired. After this, the white level correction data is used to perform white level correction processing (shading correction processing).

The image formation apparatus 3 incorporated in the lower main body 1a of the multi function machine 1 takes in a sheet recording medium (for example, paper) from a paper feed tray 51 on the rear of the multi function machine 1, forms an image on the record side of the recording medium, and ejects the recording medium with the image recorded thereon from a paper ejection port 53 on the front of the multi function machine 1, as shown in FIG. 1. A paper ejection tray 55 of a pull-out drawer is stored below the paper ejection port 53 and can be pulled out as required for receiving record paper ejected from the paper ejection port 53.

Subsequently, the read head 11 will be described in more detail.

Figure 4:
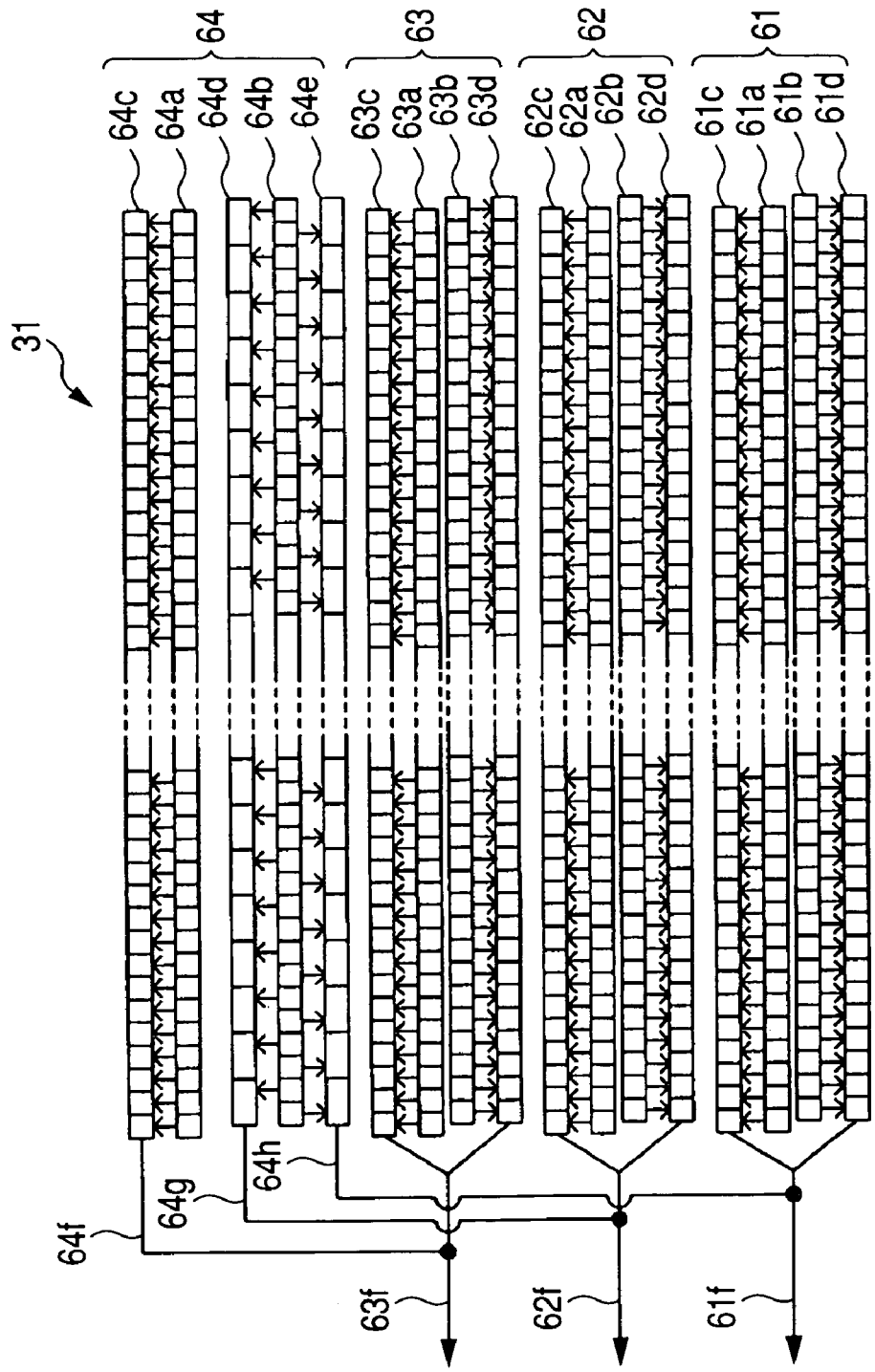
FIG. 4 is a drawing schematically showing the configuration of an image sensor.

The image sensor 31 included in the read head 11 is a four-line linear image sensor including three image reading elements 61, 62, and 63 corresponding to R (red), G (green), and B (blue), which serve as color image reading elements, and one image reading element 64, which serve as a monochrome image reading element, as shown in FIG. 4.

The R (red) image reading element 61 forming a part of the color image reading elements includes photoelectric conversion sections 61a and 61b implemented by photodiode arrays (photoelectric conversion element arrays), charge transfer sections 61c and 61d implemented by CCD shift registers (buffers), and one channel 61f for outputting data from the charge transfer sections 61c and 61d.

The photoelectric conversion sections 61a and 61b are implemented each by one photodiode array. The photoelectric conversion sections 61a and 61b are shifted by half a photodiode, namely, half a pixel relatively, so that the photo diode arrays are formed in a staggered arrangement as a whole of the photoelectric conversion sections 61a and 61b. The photodiodes in each row of the photoelectric conversion sections 61a and 61b are arranged at a density of 600 dpi (dots per inch). Both the photoelectric conversion sections 61a and 61b can be used to read an image at 1200 dpi.

The charge transfer sections 61c and 61d are analog shift registers for receiving charges, which are simultaneously transferred in parallel by the photoelectric conversion sections 61a and 61b, and shifting the charge amounts in series in order to output the charge amounts to the output side. Each of the G (green) image reading element 62 and the B (blue) image reading element 63 has a similar configuration to that of the R (red) image reading element 61 except that they differ in color filter. That is, in FIG. 4, numerals 62a, 62b, 63a, and 63b denote photoelectric conversion sections, numerals 62c, 62d, 63c, and 63d denote charge transfer sections, and numerals 62f and 63f denote channels. FIG. 4 shows the numerals of the sections and the channels thereof, and the sections and the channels will not be described in detail.

The image reading element 64 forming the monochrome image reading element includes photoelectric conversion sections 64a and 64b implemented by photodiode arrays, charge transfer sections 64c, 64d, and 64e implemented by CCD shift registers, and three channels 64f, 64g, and 64h for outputting data from the charge transfer sections 64c, 64d, and 64e.

The photoelectric conversion sections 64a and 64b have similar structures to those of the photoelectric conversion sections 61a and 61b described above. The photodiodes in each row of the photoelectric conversion sections 64a and 64b are arranged at a density of 600 dpi. Both the photoelectric conversion sections 64a and 64b can be used to read an image at 1200 dpi. The image reading element 64 has a higher sensitivity than the color image reading elements 61 to 63 because no color filter exists on the surface of each photodiode.

The charge transfer sections 64c, 64d, and 64e are analog shift registers for receiving charges, which are simultaneously transferred in parallel by the photoelectric conversion sections 64a and 64b, and shifting the charge amounts in series in order to output the charge amounts to the output side. The charge transfer section 64c receives charges provided by the photoelectric conversion section 64a, the charge transfer section 64d receives charges provided by the odd-numbered elements of the photoelectric conversion section 64b, and the charge transfer section 64e receives charges provided by the even-numbered elements of the photoelectric conversion section 64b. Here, the arrangement order of the elements is counted from right to left in FIG. 4.

Such a configuration makes it possible not only to provide 1200-dpi data as output from the three charge transfer sections 64c, 64d, and 64e, but also to provide 600-dpi data as output from the one charge transfer section 64c or the two charge transfer sections 64d and 64e. Also, 300-dpi data can be provided as output from any one of the three charge transfer sections 64c, 64d, 64e. In a case of providing 300-dpi data, the 600-dpi data provided by the charge transfer section 64c can be converted into 300 dpi data (adding the charges provided by the odd-numbered and even-numbered elements) to provide higher-image-quality 300-dpi data, which will be hereinafter also called high-image-quality 300-dpi data. Alternatively, 300-dpi data can also be provided at higher speed without executing conversion by either the charge transfer section 64d or 64e, which will be hereinafter also called high-speed 300-dpi data.

The three channels 64f, 64g, and 64h for outputting data from the charge transfer sections 64c, 64d, and 64e share data output terminals with the three channels 61f, 62f, and 63f of the color image reading elements 61 to 63. Thus, the data is transmitted through the data output terminals regardless of which of a color image and a monochrome image is read. To transfer data, switching is performed between the color image reading elements 61 to 63 and the monochrome image reading element 64 as color or monochrome mode is selected through a selector (not shown).

In the image reading elements 61 to 64 described above, the arrangement direction of the photodiodes making up the photoelectric conversion sections is a main scanning direction and a plurality of photodiode rows are spaced from each other in a subscanning direction orthogonal to the main scanning direction. The spacing in the subscanning direction is adjusted so as to become an integral multiple of the size of each element (one-line read width corresponding to the maximum read resolution). Therefore, if an image of one line is read at a timing with considering the spacing in the subscanning direction while an original and the read head 11 are moved relatively in the read resolution units in the subscanning direction, the image of one line can be read from the same position on the original although the image reading elements 61 to 64 differ in read target position.

Figure 5:
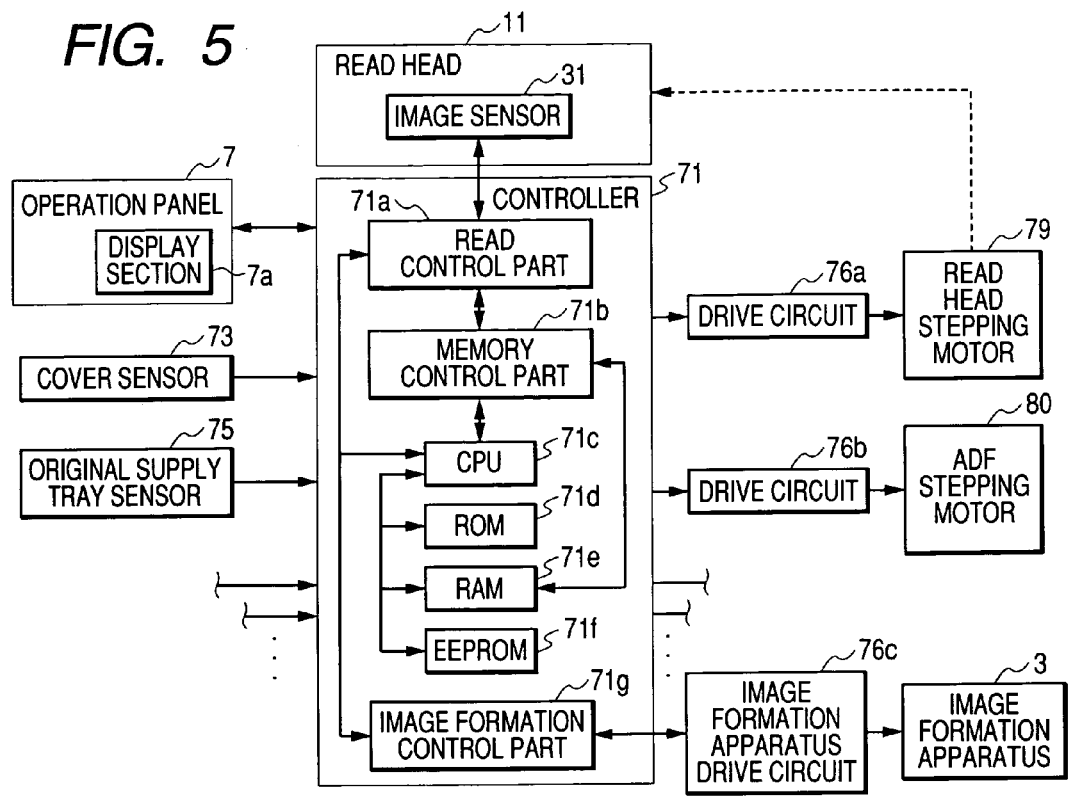
FIG. 5 is a block diagram showing a part of a control system of the multi function machine.

The multi function machine 1 includes a controller 71 for controlling the operation of the image reader 5 and the image formation apparatus 3, as shown in FIG. 5. The controller 71 includes a read control part 71a, a memory control part 71b, a CPU 71c, a ROM 71d, a RAM 71e, an EEPROM 71f, and an image formation control part 71g. The operation panel 7, a cover sensor 73, an original supply tray sensor 75, drive circuits 76a, 76b for driving a read head stepping motor 79 and an ADF stepping motor 80, respectively, and an image formation apparatus drive circuit 76c for driving the image formation apparatus 3 are electrically connected to the controller 71.

The cover sensor 73 detects open/close operation of the cover section 5b. The original supply tray sensor 75 detects that an original is set on the original supply tray 21. The operation panel 7 is provided with the display section 7a for displaying various messages. The read head stepping motor 79 operates to move the read head 11 in the subscanning direction. The ADF stepping motor 80 operates to drive rollers to transport originals from the original supply tray 21 to the original ejection tray 25.

The read control part 71a controls the operation of the image sensor, converts outputs sent from the image sensor 31 via the channels 61f, 62f and 63f shown in FIG. 4 into digital signals, and outputs as serial data to the memory control part 71b. The memory control part 71b conducts write control of image data and read control of the image data. The CPU 71c controls the whole operation of the controller 71. The ROM 71d stores various programs for CPU 71c to conduct respective controls. The RAM 71e stores the image data, etc., and the EEPROM 71f stores various setting information. The image formation control part 71g controls the image formation apparatus drive circuit 76c that causes the image formation apparatus 3 to form images on the recording medium based on the image data read by the image sensor 31.

Figure 6:
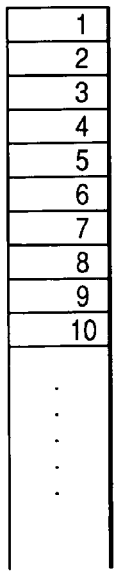
FIG. 6 is a drawing showing the data structure in memory.

The memory control part 71b sequentially sends the image data input from the read control part 71a to the RAM 71e, and the image data are stored in the data area of the RAM 71e according to a data structure as shown in FIG. 6. The memory control part 71b reads out pixel data stored in the RAM 71e in accordance with an instruction from the CPU 71c and sends the pixel data to the CPU 71c.

The multi function machine 1 includes the control system related to the communication unit in addition to the control systems related to the image reader 5 and the image formation apparatus 3, and these control systems provide the functions of printer, copier, and facsimile in conjunction with each other. However, the control systems for the image formation apparatus and the communication unit are not the main part of the invention and therefore will not be described or shown.

Figure 17:
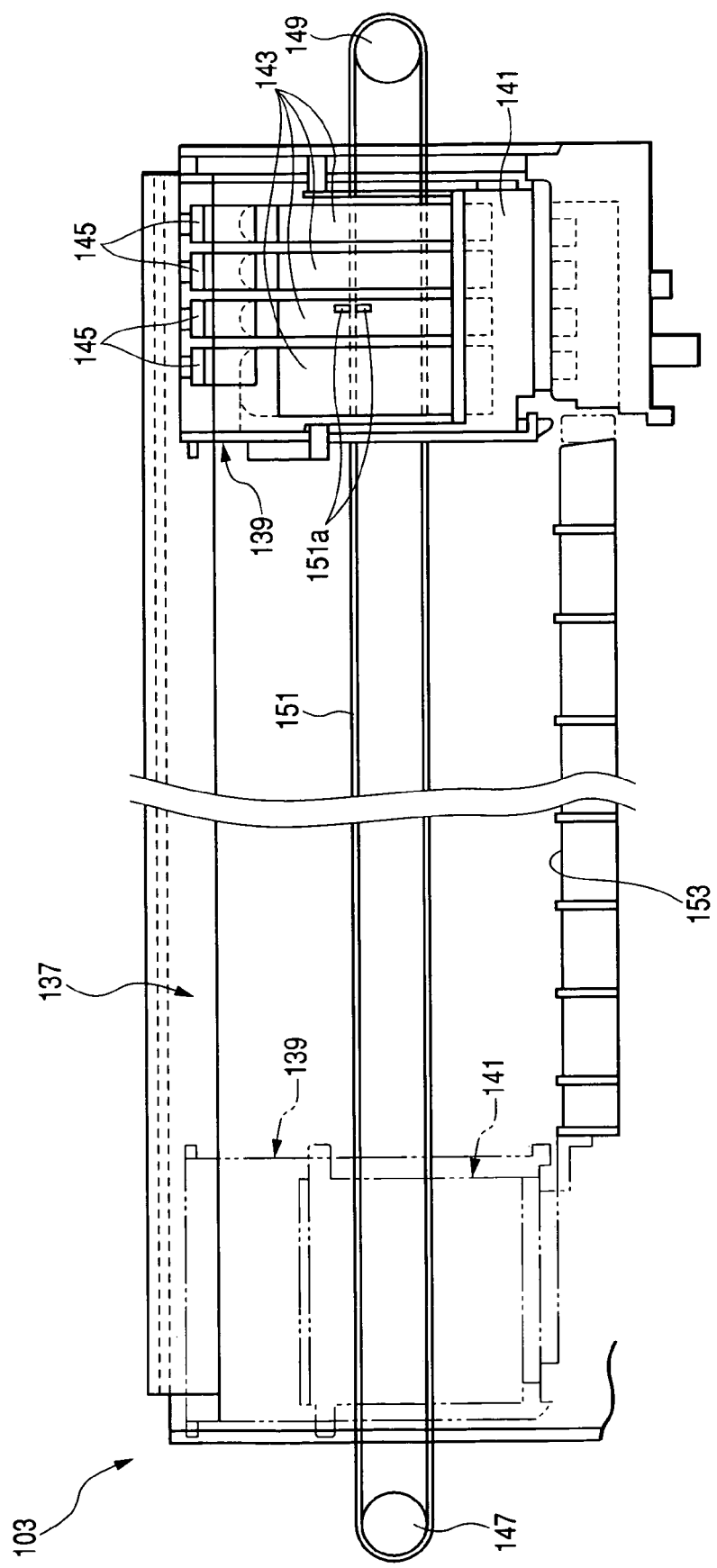
FIG. 17 is a drawing showing an image formation mechanism of an image formation section.

Subsequently, with reference to FIG. 17, an image formation mechanism 103 of the image formation section 3 will be described. The image formation mechanism 103 includes a long frame 137 that extends in a left-right direction. A guide shaft (not shown) is provided in parallel with the longitudinal direction of the frame 137. A carriage 139 is attached to contact with the guide shaft in a manner that the carriage is reciprocatingly movable in the longitudinal direction.

A recording head 141 of color inkjet cartridge type is attached to the carriage in a downwardly oriented manner. The recording head 141 is provided with four nozzle portions (not shown) on a lower face thereof to eject ink of respective colors of cyan, yellow, magenta and black. Ink cartridges 143 of respective colors in which ink to be supplied to the recording head 141 is accommodated are detachably attached to an upper face side of the recording head 141. Levers 145 being forwardly rotatable at an upper face side of the carriage 139 fix the respective ink cartridges downwardly.

A passive pulley 147 is disposed at one side of the image formation mechanism 103, and a drive pulley 149 is disposed at the other side. The drive pulley 149 is fixed to a drive shaft of a drive motor (not shown) such as a stepping motor that is forwardly/reversely rotatable. A timing belt 151 is wound around the passive pulley 147 and the drive pulley 149. A portion 151a of the timing belt 151 is connected to the carriage 139. Thus, as the drive pulley 149 rotates, a drive force is transmitted to the carriage 139 via the timing belt 151, and therefore the carriage is reciprocatingly moved along the longitudinal direction.

In addition, the multi function machine 1 has a well-known paper feed mechanism (not shown) including the paper feed tray 51 and a feed roller. The recording paper thus fed is then sent to the position between the recording head 141 and a platen 153 to be printed. The recording paper is then transported by the well-known feed roller and ejected to the paper ejection tray 55.

Subsequently, the processing of the multi function machine 1 for reading images of a plurality of originals through the image reader 5 and forming the read images on one side of one recording medium (in this embodiment, paper) in predetermined arrangement by the image formation apparatus 3 will be described.

In this processing, the following three conditions are mainly determined:

1) Two-in-one copy or four-in-one copy?

2) image is read from original set on ADF or FB?

3) original image is portrait image or landscape image?

Different processing is performed based on these three conditions. The order in which the three conditions are determined is not limited. Two or all of the three conditions may be determined at the same time.

Processing for feeding originals having portrait images from the ADF and reading the images and processing for setting originals having portrait images on the FB and reading the images will be described conceptually with reference to FIG. 7.

Originals fed from the ADF and originals placed on the FB differ in the orientation of images with respect to the read head 11. In the case of reading the images from originals set on the FB, pixel data thus read is stored in the memory in an order opposite to a scanning order in the main scanning direction (the scanning direction parallel with the orientation of the short side of the original), whereby the pixel data can be stored in the memory in the same order as in the case of reading the images from originals fed from the ADF.

Figure 7:
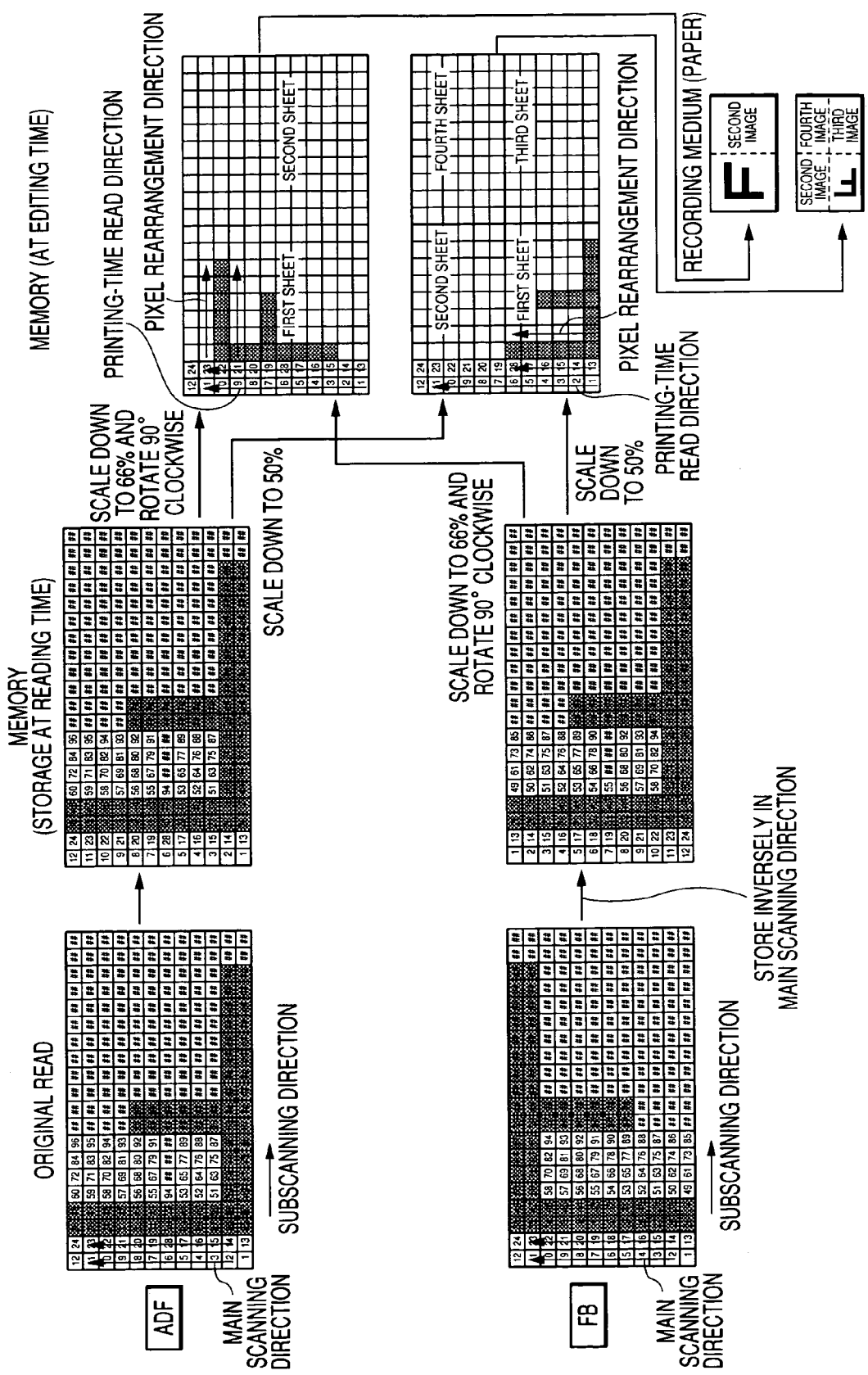
FIG. 7 is a drawing showing processing for feeding originals having portrait images from an ADF and reading the images and processing for setting originals having portrait images on a FB and reading the images.

When originals are fed from the ADF and images are read and a two-in-one copy is to be made, the image on the first sheet of the original (odd-numbered page) stored in the memory is scaled down to 66% and is rotated 90° clockwise in FIG. 7 and editing is performed (pixel data is rearranged) so that the image is placed in the upper half of the paper to print the image (left in FIG. 7). The image on the second sheet of the original (even-numbered page) stored in the memory is scaled down to 66% and is rotated 90° clockwise in FIG. 7 and editing is performed so that the image is placed in the lower half of the paper (right in FIG. 7).

At the printing time, the image data is read along the printing-time read direction indicated by the arrow in FIG. 7 and the image on the first sheet of the original and the image on the second sheet of the original are printed on one sheet of paper.

When originals are fed from the ADF and images are read and a four-in-one copy is to be made, the image on the first sheet of the original stored in the memory is scaled down to 50% and is not rotated and editing is performed so that the image is placed in the upper-left portion of the paper to print the image (lower-left area in FIG. 7). The image on the second sheet of the original stored in the memory is scaled down to 50% and is not rotated and editing is performed so that the image is placed in the upper-right portion of the paper (upper-left area in FIG. 7). The image on the third sheet of the original stored in the memory is scaled down to 50% and is not rotated and editing is performed so that the image is placed in the lower-left portion of the paper (lower-right area in FIG. 7). Further, the image on the fourth sheet of the original stored in the memory is scaled down to 50% and is not rotated and editing is performed so that the image is placed in the lower-right portion of the paper (upper-right area in FIG. 7).

At the printing time, the image data is read along the printing-time read direction indicated by the arrow in FIG. 7 and the images on the first to fourth sheets of the original are printed on one sheet of paper.

When originals are placed on the FB and images are read and a two-in-one copy or a four-in-one copy is to be made, the images are edited and printed in a similar manner to that with the ADF described above.

However, when originals are placed on the FB and images are read, the pixel data thus read is stored in the memory in an order opposite to the scanning order in the main scanning direction.

In fact, an image is scaled down at the same time as the image is read, as described later. However, it is also possible to scale down the image after reading the image without being scaled down, as shown in FIG. 7.

Figure 8:
FIG. 8 is a drawing showing an exception occurring on rare occasion in setting originals having portrait images on the FB and reading the images.

If an original is set on the FB with the image orientation as shown in "ORIGINAL READ" in FIG. 8, the data is stored in the memory in a different order from that in the example shown in FIG. 7. In this case, if the image is edited and printed as with the processing shown in FIG. 7, appropriate printing is not accomplished. However, it is rare to set a portrait original on the FB with the image orientation as shown in FIG. 8. This multi function machine 1 does not take measures to prevent the user from setting an original as shown in FIG. 8 (for example, measures to display the correct up and down orientation of the original image on the display section 7a or the like). Taking such measures results in intricate operation of the user. By conducting an image processing while assuming a predetermined original setting direction that is likely chosen by the user with high probability, the two-in-one copy or the four-in-one copy can be made easily and rapidly.

Subsequently, processing for feeding originals having landscape images from the ADF and reading the images and processing for setting originals having landscape images on the FB and reading the images will be described conceptually with reference to FIG. 9.

Figure 9:
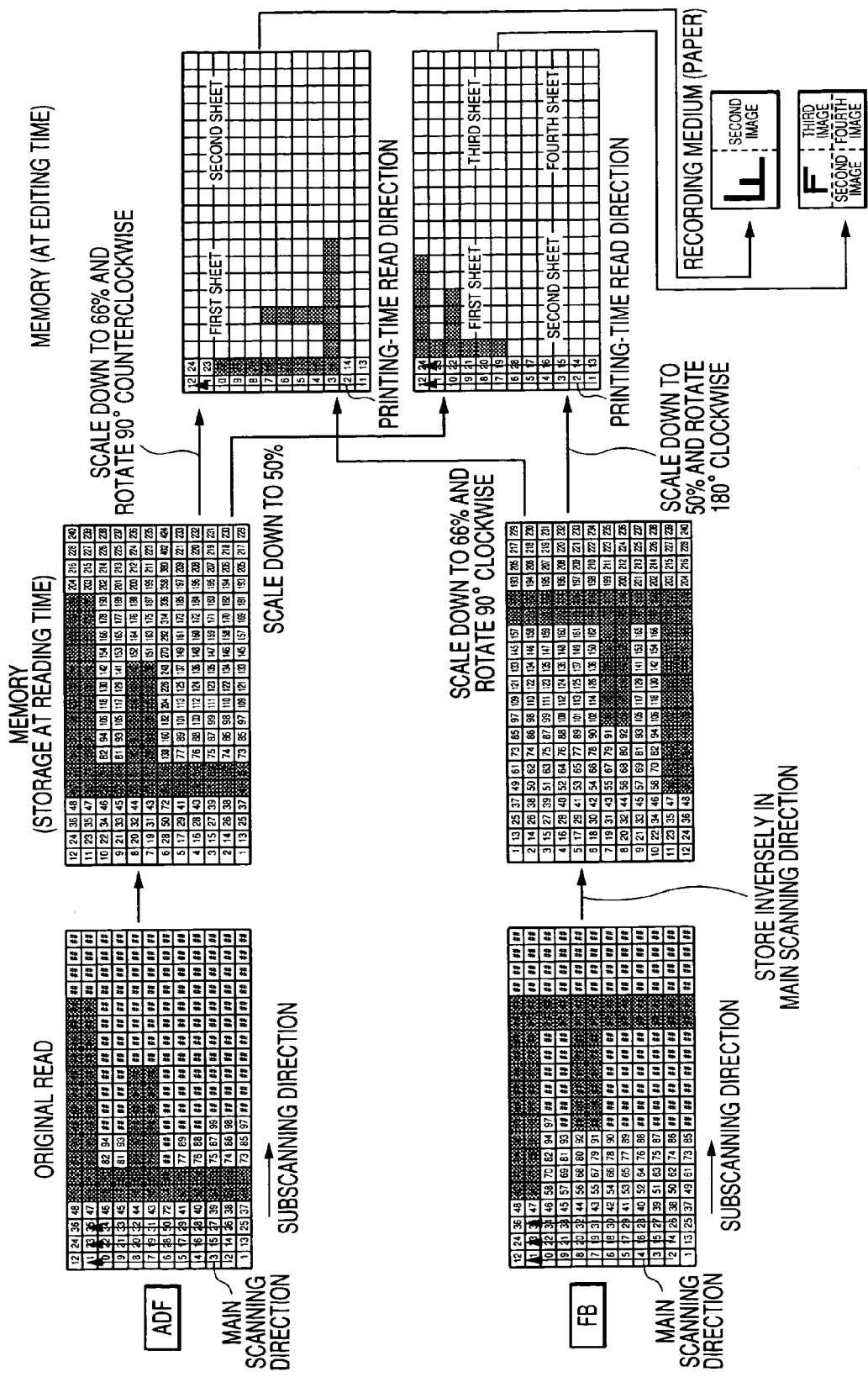
FIG. 9 is a drawing showing processing for feeding originals having landscape images from the ADF and reading the images and processing for setting originals having portrait images on the FB and reading the images.

When originals are fed from the ADF and images are read and a two-in-one copy is to be made, the image on the first sheet of the original (odd-numbered page) stored in the memory is scaled down to 66% and is rotated 90° counter-clockwise in FIG. 9 and editing is performed so that the image is placed in the upper half of the paper to print the image (left in FIG. 9). The image on the second sheet of the original (even-numbered page) stored in the memory is scaled down to 66% and is rotated 90° counterclockwise in FIG. 9 and editing is performed so that the image is placed in the lower half of the paper (right in FIG. 9).

At the printing time, the image data is read along the printing-time read direction and the image on the first sheet of the original and the image on the second sheet of the original are printed on one sheet of paper.

When originals are fed from the ADF and images are read and a four-in-one copy is to be made, the image on the first sheet of the original stored in the memory is scaled down to 50% and is not rotated and editing is performed so that the image is placed in the upper-right portion of the paper to print the image (upper-left area in FIG. 9). The image on the second sheet of the original stored in the memory is scaled down to 50% and is not rotated and editing is performed so that the image is placed in the upper-left portion of the paper (lower-left area in FIG. 9). The image on the third sheet of the original stored in the memory is scaled down to 50% and is not rotated and editing is performed so that the image is placed in the lower-right portion of the paper (upper-right area in FIG. 9). Further, the image on the fourth sheet of the original stored in the memory is scaled down to 50% and is not rotated and editing is performed so that the image is placed in the lower-left portion of the paper (lower-right area in FIG. 9).

At the printing time, the image data is read along the printing-time read direction and the images on the first to fourth sheets of the original are printed on one sheet of paper.

When originals are placed on the FB and images are read and a two-in-one copy is to be made, the image on the first sheet of the original (odd-numbered page) stored in the memory is scaled down to 66% and is rotated 90° clockwise in FIG. 9 and editing is performed so that the image is placed in the upper half of the paper to print the image (left in FIG. 9). The image on the second sheet of the original (even-numbered page) stored in the memory is scaled down to 66% and is rotated 90° clockwise in FIG. 9 and editing is performed so that the image is placed in the lower half of the paper (right in FIG. 9).

At the printing time, the image data is read along the printing-time read direction and the image on the first sheet of the original and the image on the second sheet of the original are printed on one sheet of paper.

When originals are placed on the FB and images are read and a four-in-one copy is to be made, the image on the first sheet of the original stored in the memory is scaled down to 50% and is rotated 180° clockwise in FIG. 9 and editing is performed so that the image is placed in the upper-right portion of the paper to print the image (upper-left area in FIG. 9). The image on the second sheet of the original stored in the memory is scaled down to 50% and is rotated 180° clockwise in FIG. 9 and editing is performed so that the image is placed in the upper-left portion of the paper (lower-left area in FIG. 9). The image on the third sheet of the original stored in the memory is scaled down to 50% and is rotated 180° clockwise in FIG. 9 and editing is performed so that the image is placed in the lower-right portion of the paper (upper-right area in FIG. 9). Further, the image on the fourth sheet of the original stored in the memory is scaled down to 50% and is rotated 180° clockwise in FIG. 9 and editing is performed so that the image is placed in the lower-left portion of the paper (lower-right area in FIG. 9).

At the printing time, the image data is read along the printing-time read direction and the images on the first to fourth sheets of the original are printed on one sheet of paper.

In fact, an image is scaled down at the same time as the image is read, as described later. However, it is also possible to scale down the image after reading the image without being scaled down, as shown in FIG. 9.

Figure 10:
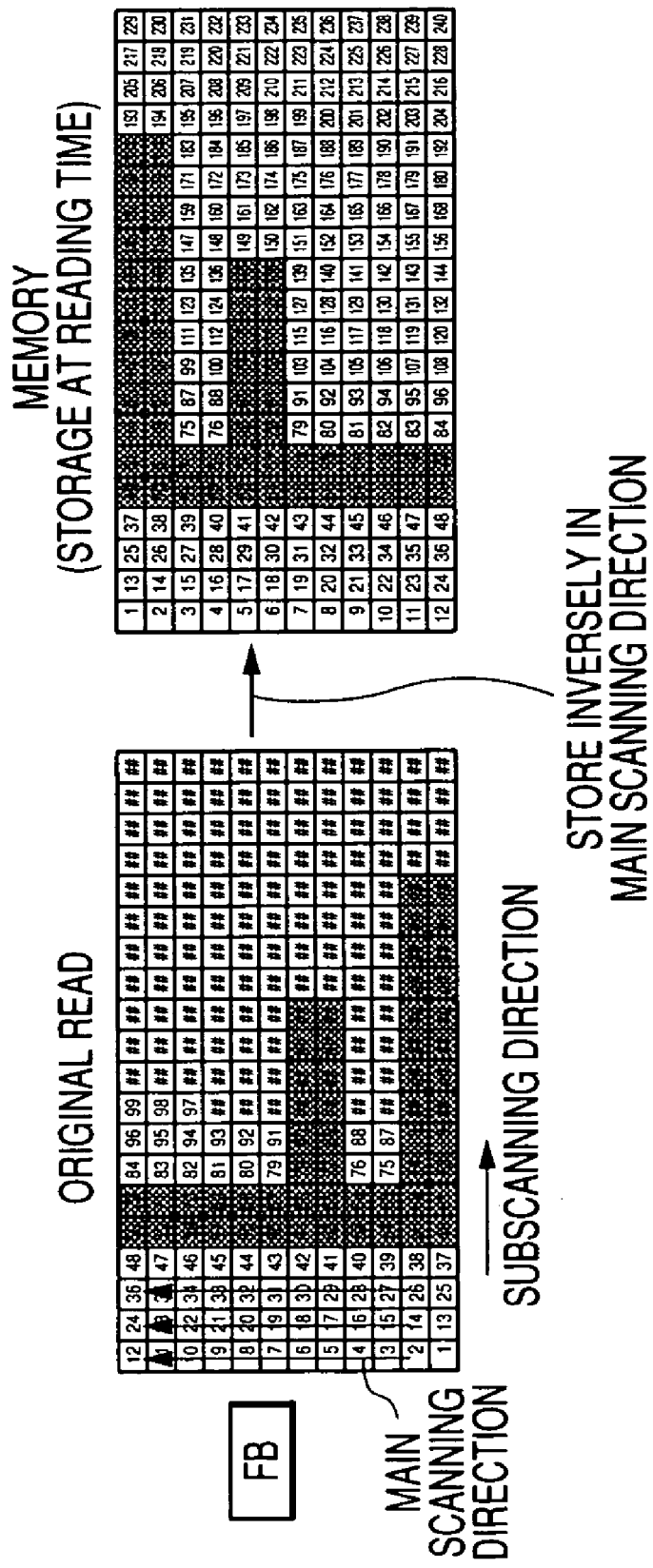
FIG. 10 is a drawing showing an exception occurring on rare occasion in setting originals having landscape images on the FB and reading the images.

If an original is set on the FB with the image orientation as shown in "ORIGINAL READ" in FIG. 10, the data is stored in the memory in a different order from that in the example shown in FIG. 9. In this case, if the image is edited and printed as with the processing shown in FIG. 9, appropriate printing is not accomplished. However, it is rare to set a landscape original on the FB with the image orientation as shown in FIG. 10. This multi function machine 1 does not take measures to prevent the user from setting an original as shown in FIG. 10 (for example, measures to display the correct up and down orientation of the original image on the display section 7a or the like). Taking such measures results in intricate operation of the user. By conducting an image processing assuming a predetermined original setting direction that is likely chosen by the user with high probability, the user can make two-in-one copy or the four-in-one copy easily and rapidly without being worried over how to place the originals.

Figure 12:
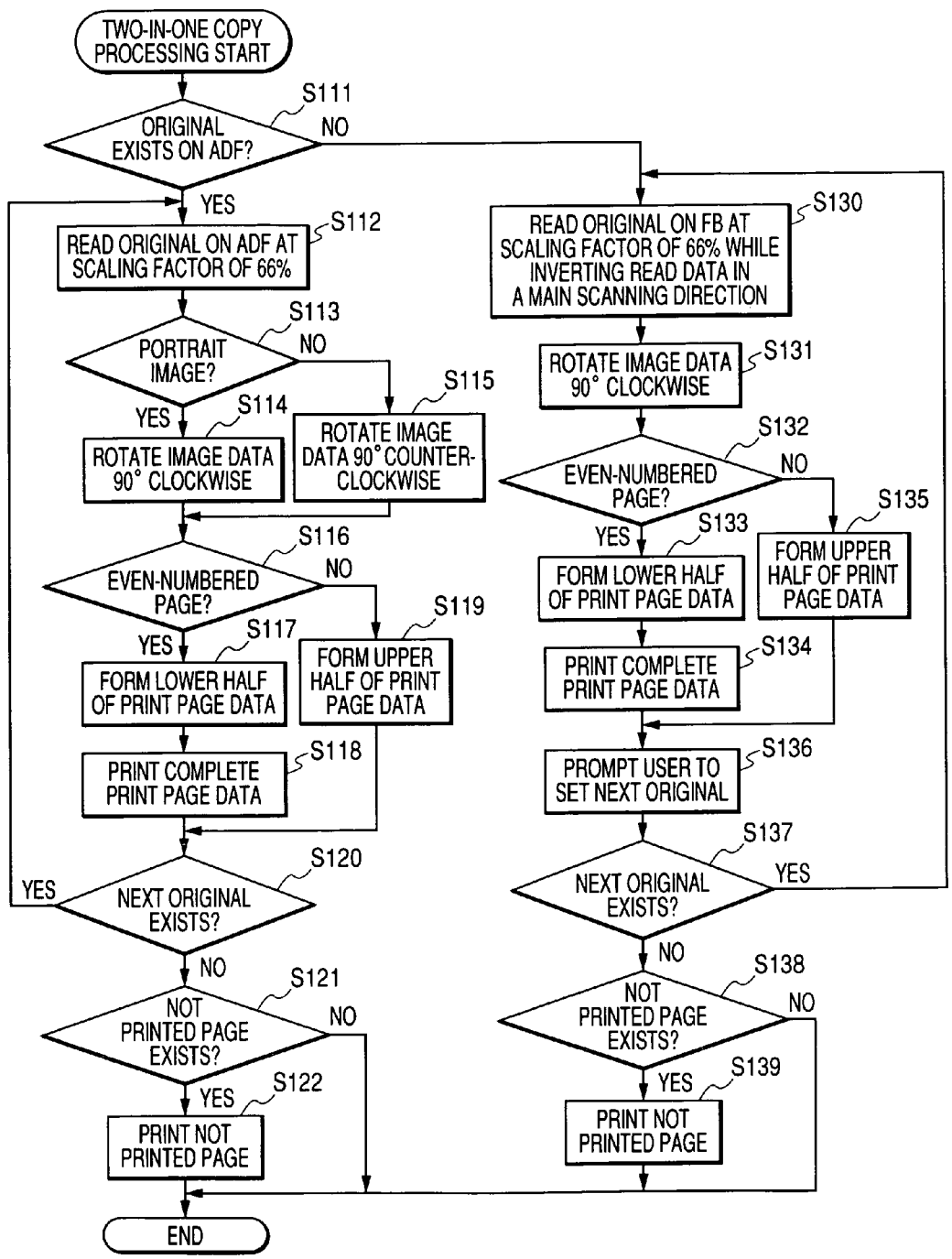
FIG. 12 is a flowchart showing two-in-one copy processing.
Figure 13:
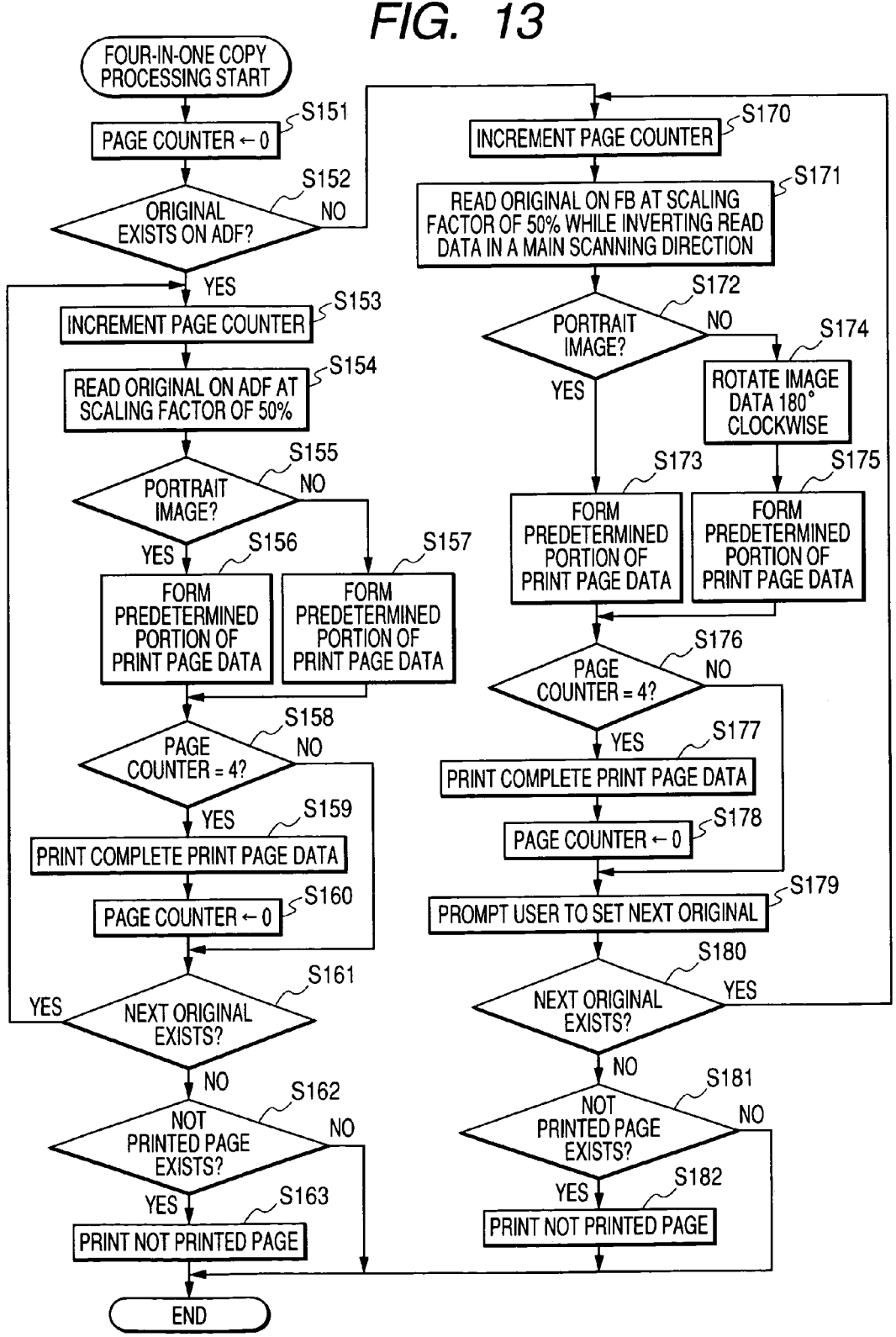
FIG. 13 is a flowchart showing four-in-one copy processing.

Subsequently, copy processing in the multi function machine 1 will be described with reference to FIGS. 11 to 13.

Figure 11:
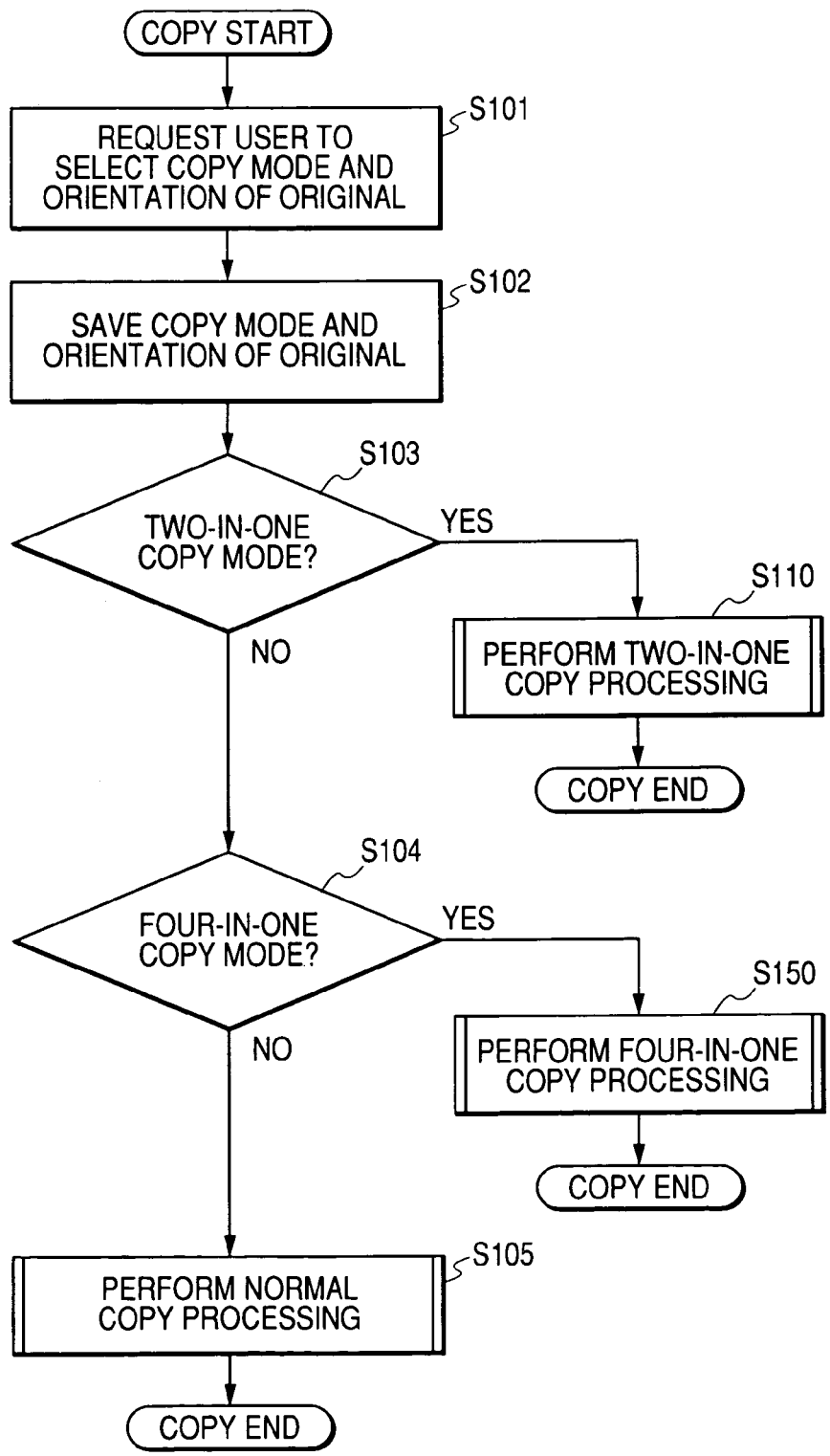
FIG. 11 is a flowchart showing copy processing.

When the user operates the operation panel 7 to enter a command of a two-in-one copy or a four-in-one copy, first the multi function machine 1 requests the user to select the copy mode (two-in-one copy or four-in-one copy) and the orientation of the original image (portrait image or landscape image) (S101) as shown in FIG. 11.

Figures 14, 15A, 15B:
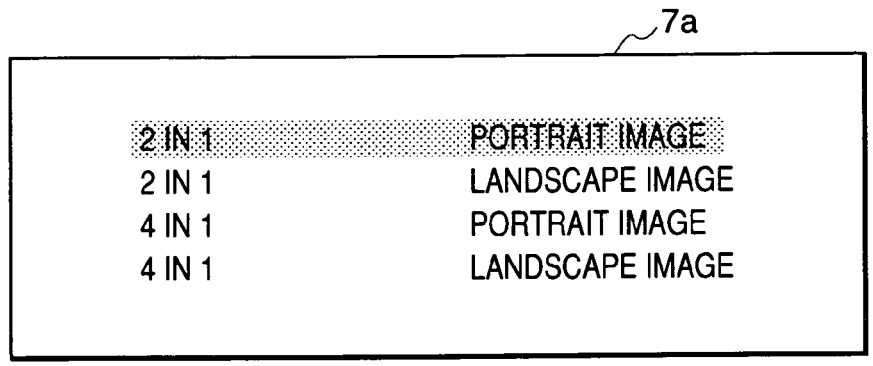
FIG. 14 is a drawing showing an example of display on a display section.
FIGS. 15A and 15B are drawings showing the relationship between values of a page counter and image positions.

For example, the display section 7a displays a screen as shown in FIG. 14. As such a screen is displayed, the multi function machine 1 enables the user to select the copy mode and the orientation of the original image at the same time.

The multi function machine 1 saves the selected copy mode and the selected orientation of the original image (S102) as shown in FIG. 11.

Next, the multi function machine 1 determines whether or not the two-in-one copy mode is selected (S103). If the multi function machine 1 determines that the two-in-one copy mode is not selected, it determines whether or not the four-in-one copy mode is selected (S104). If the multi function machine 1 determines that the four-in-one copy mode is not selected, it performs normal copy processing (S105) and terminates the copy.

If the multi function machine 1 determines at S103 that the two-in-one copy mode is selected, it performs two-in-one copy processing (S110) and terminates the copy.

If the multi function machine 1 determines at S104 that the four-in-one copy mode is selected, it performs four-in-one copy processing (S150) and terminates the copy.

Next, the two-in-one copy processing will be described with reference to FIG. 12. First, the multi function machine 1 uses the original supply tray sensor 75 (see FIG. 5) to determine whether or not an original is set on the ADF (S111).

If the multi function machine 1 determines that an original is set on the ADF, it uses the image reader 5 to read the image of the original set on the ADF while scaling down the image at a scaling factor of 66% (S112).

Next, the multi function machine 1 determines whether or not the read image is a portrait image based on the data of the orientation of the original image saved at S102 in FIG. 11 (S113). When the multi function machine 1 determines that the read image is a portrait image, it rotates the image data 90° clockwise (S114); when the multi function machine 1 determines that the read image is a landscape image, it rotates the image data 90° counterclockwise (S115).

Next, the multi function machine 1 determines whether or not the read original is an even-numbered page (S116). When the multi function machine 1 determines that the read original is an even-numbered page, it forms the lower half of print page data (right half in FIG. 7) (S117) and prints complete print page data on paper (S118).

When the multi function machine 1 determines that the read original is an odd-numbered page, it forms the upper half of print page data (left half in FIG. 7) (S119).

The multi function machine 1 determines whether or not the next original exists (S120). If the multi function machine 1 determines that the next original exists, it repeats the operation starting at S112. If the multi function machine 1 determines that the next original does not exist, it determines whether or not a page that has not been printed exists (S121). If the multi function machine 1 determines that the page that has not been printed exists, it prints the page (S122). When only the upper half of print page data exists, the multi function machine 1 prints the upper half data while the lower half of the page is made blank, and terminates the two-in-one copy processing. If the multi function machine 1 determines that the page that has not been printed does not exist, it terminates the two-in-one copy processing while skipping S122.

If the multi function machine 1 determines at S111 that no original is set on the ADF, it uses the image reader 5 to read the image of the original set on the FB while scaling down the image at a scaling factor of 66% (S130). The pixel data thus read is stored in the memory in an order opposite to a scanning order in the main scanning direction.

The multi function machine 1 then rotates the read image data 90° clockwise (S131).

Next, the multi function machine 1 determines whether or not the read original is an even-numbered page (S132). When the multi function machine 1 determines that the read original is an even-numbered page, it forms the lower half of print page data (right half in FIG. 7) (S133) and prints complete print page data on paper (S134).

When the multi function machine 1 determines that the read original is an odd-numbered page, it forms the upper half of print page data (left half in FIG. 7) (S135).

The multi function machine 1 prompts the user to set the next original (S136). The multi function machine 1 determines whether or not the next original exists (S137). If the multi function machine 1 determines that the next original exists, it repeats the operation starting at S130. If the multi function machine 1 determines that the next original does not exist, it determines whether or not a page that has not been printed exists (S138). If the multi function machine 1 determines that the page that has not been printed exists, it prints the page (S139). When only the upper half of print page data exists, the multi function machine 1 prints the upper half data while the lower half of the page is made blank, and terminates the two-in-one copy processing. If the multi function machine 1 determines that the page that has not been printed does not exist, it terminates the two-in-one copy processing while skipping S139.

Subsequently, the four-in-one copy processing will be described with reference to FIG. 13. First, the multi function machine 1 sets an internal page counter (not shown) to 0 (S151). Next, the multi function machine 1 uses the original supply tray sensor 75 (see FIG. 5) to determine whether or not an original is set on the ADF (S152).

If the multi function machine 1 determines that an original is set on the ADF, it increments the value of the page counter (S153) and uses the image reader 5 to read the image of the original set on the ADF while scaling down the image at a scaling factor of 50% (S154).

Next, the multi function machine 1 determines whether or not the read image is a portrait image based on the data of the orientation of the original image saved at S102 in FIG. 11

(S155). When the multi function machine 1 determines that the read image is a portrait image, it does not rotate the image data and forms a predetermined portion of print page data in accordance with the relationship between the value of the page counter and the image position as shown in FIG. 15A (S156). That is, if the value of the page counter is 1, the image to be printed in the upper-left portion of paper is formed.

When the multi function machine 1 determines that the read image is a landscape image, it does not rotate the image data and forms a predetermined portion of print page data in accordance with the relationship between the value of the page counter and the image position as shown in FIG. 15B (S157). That is, if the value of the page counter is 1, the image to be printed in the upper-right portion of paper is formed.

Next, the multi function machine 1 determines whether or not the value of the page counter equals 4 (S158). When the multi function machine 1 determines that the value of the page counter equals 4, it prints complete print page data on paper (S159) and resets the value of the page counter to 0 (S160). When the multi function machine 1 determines at S158 that the value of the page counter does not equal 4, it skips S159 and S160.

The multi function machine 1 determines whether or not the next original exists (S161). If the multi function machine 1 determines that the next original exists, it repeats the operation starting at S153. If the multi function machine 1 determines that the next original does not exist, it determines whether or not a page that has not been printed exists (S162). If the multi function machine 1 determines that the page that has not been printed exists, it prints the page (S163). When the upper right, lower left or lower right of print page data does not exist for example, the multi function machine 1 makes that area as blank, and terminates the four-in-one copy processing. If the multi function machine 1 determines that the page that has not been printed does not exist, it terminates the four-in-one copy processing while skipping S163.

If the multi function machine 1 determines at S152 that no original is set on the ADF, it increments the value of the page counter (S170) and uses the image reader 5 to read the image of the original set on the FB while scaling down the image at a scaling factor of 50% (S171). The read image is stored in the memory in an order opposite to a scanning order in the main scanning direction.

Next, the multi function machine 1 determines whether or not the read image is a portrait image based on the data of the orientation of the original image saved at S102 in FIG. 11 (S172). When the multi function machine 1 determines that the read image is a portrait image, it does not rotate the image data and forms a predetermined portion of print page data in accordance with the relationship between the value of the page counter and the image position as shown in FIG. 15A (S173). When the multi function machine 1 determines that the read image is a landscape image, it rotates the image data 180° clockwise (S174) and forms a predetermined portion of print page data in accordance with the relationship between the value of the page counter and the image position as shown in FIG. 15B (S175).

Next, the multi function machine 1 determines whether or not the value of the page counter equals 4 (S176). When the multi function machine 1 determines that the value of the page counter equals 4, it prints complete print page data on paper (S177) and resets the value of the page counter to 0 (S178). When the multi function machine 1 determines at S176 that the value of the page counter does not equal 4, it skips S177 and S178.

The multi function machine 1 prompts the user to set the next original (S179). The multi function machine 1 determines whether or not the next original exists (S180). If the multi function machine 1 determines that the next original exists, it repeats the operation starting at S170. If the multi function machine 1 determines that the next original does not exist, it determines whether or not a page that has not been printed exists (S181). If the multi function machine 1 determines that the page that has not been printed exists, it prints the page (S182). When the upper right, lower left or lower right of print page data does not exist for example, the multi function machine 1 makes that area as blank, and terminates four-in-one copy processing. If the multi function machine 1 determines that the page that has not been printed does not exist, it terminates the four-in-one copy processing while skipping S182.

The multi function machine 1 eliminates the need for the user to see the display section 7a to check the correct top and bottom orientation of the image of the original to be placed, so that a two-in-one copy or a four-in-one copy can be made easily and rapidly. If the user sets originals in a natural sense, a two-in-one copy or a four-in-one copy is made appropriately, so that the user does not worry over how to place the originals.

As the screen as shown in FIG. 14 is displayed, the multi function machine 1 allows the user to select the copy mode and the orientation of the original image at the same time for more enhancing the ease of use.

The multi function machine 1 also enables the user to make a two-in-one copy or a four-in-one copy of an original set on the FB and thus can provide high convenience for the user. For example, the user can place a book or a magazine having a predetermined thickness on the FB to make a two-in-one copy or a four-in-one copy. The user can also make a two-in-one copy or a four-in-one copy of an original that cannot be fed with the ADF or an original hard to be fed with the ADF.

Since the installation space of the multi function machine 1 is small, the multi function machine 1 is fitted for installation in a SOHO.

In addition, appropriate printing can be accomplished even in a case in which a scanning direction of the image reader 5 is changed instead of editing the pixel data on the memory after scanning.

Steps S152 to S163 in FIG. 16 executed when an original is fed from the ADF are identical with steps S152 to S163 previously described with reference to FIG. 13 and therefore will not be discussed again.

If the multi function machine 1 determines at S152 that no original is set on the ADF, it increments the value of the page counter (S200) and determines whether or not the read image is a portrait image based on the data of the orientation of the original image saved at S102 in FIG. 11 (S201).

When the multi function machine 1 determines that the read image is a portrait image, it uses the image reader 5 to read the image of the original set on the FB, while scaling down the image at a scaling factor of 50%, in the main scanning direction opposite to the main scanning direction shown in FIG. 7 (direction from top to bottom in FIG. 7; the opposite direction to the main scanning direction when paper is fed from the ADF) and in the same subscanning direction as the subscanning direction shown in FIG. 7 (direction from left to right in FIG. 8) (S202). The pixel data thus read is stored in the memory in a scanning order of the main scanning direction without inverting the order. The multi function machine 1 forms a predetermined portion of print page data in accordance with the relationship between the value of the page counter and the image position as shown in FIG. 15A (S203).

When the multi function machine 1 determines that the read image is a landscape image, it uses the image reader 5 to read the image of the original set on the FB, while scaling down the image at a scaling factor of 50%, in the same main scanning direction as the main scanning direction shown in FIG. 9 (direction from bottom to top in FIG. 9; the same direction as the main scanning direction when paper is fed from the ADF) and in the subscanning direction opposite to the subscanning direction shown in FIG. 9 (direction from right to left in FIG. 9) (S204). The pixel data thus read is stored in the memory in a scanning order of main scanning direction without inverting the order. The multi function machine 1 forms a predetermined portion of print page data in accordance with the relationship between the value of the page counter and the image position as shown in FIG. 15B (S205).

Next, the multi function machine 1 determines whether or not the value of the page counter equals 4 (S206). When the multi function machine 1 determines that the value of the page counter equals 4, it prints complete print page data on paper (S207) and resets the value of the page counter to 0 (S208). When the multi function machine 1 determines at S206 that the value of the page counter does not equal 4, it skips S207 and S208.

The multi function machine 1 prompts the user to set the next original (S209). The multi function machine 1 determines whether or not the next original exists (S210). If the multi function machine 1 determines that the next original exists, it repeats the operation starting at S200. If the multi function machine 1 determines that the next original does not exist, it determines whether or not a page that has not been printed exists (S211). If the multi function machine 1 determines that the page that has not been printed exists, it prints the page (S212). When the upper right, lower left or lower right of print page data does not exist for example, the multi function machine 1 makes that area as blank, and terminates four-in-one copy processing. If the multi function machine 1 determines that the page that has not been printed does not exist, it terminates the four-in-one copy processing while skipping S212.

As the processing as in FIG. 16 is performed, print errors can be still more decreased without putting a load on the user.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A copying apparatus for copying an image read from an original having a long side and a short side to a recording medium, the copying apparatus comprising:
   a first original placement section with a predetermined orientation of the long and short sides of the original to be placed;
   a second original placement section with a predetermined orientation of the long and short sides of the original to be placed;
   a feeder that transports the original from the first original placement section;
   an image read section that reads the image from the original that has been placed on the first original placement section while the image read section is moved relative to the original and from the original that has been transported from the second original placement section while the image read section is stationary;
   a storage section that stores data of the image read by the image read section;
   a detection section that detects which of the first and second original placement sections the original is placed in;
   an image orientation specifying section that specifies whether the top and bottom orientation of the image of the original placed in the first or second original placement section is in parallel with the long side of the original or in parallel with the short side of the original;
   an image formation section that forms the image on the recording medium; and
   a control section that controls the image formation section, wherein:
   the control section causes the image formation section to form images of two originals read by the image read section on one side of one recording medium in a predetermined order and in a predetermined layout based on a plurality of conditions, the plurality of conditions including a first condition, a second condition, a third condition, a fourth condition and a fifth condition,
   the first condition is set for the detection section to detect that the original is read from the first original placement section,
   the second condition is set for the image orientation specifying section to specify that a long side of the first original placement section is parallel with a top or bottom side of the original,
   the third condition is set for the image orientation specifying section to specify that the long side of the original is perpendicular to a top or bottom side of the first original placement section,
   the fourth condition is set for the detection section to detect that the original is read from the second original placement section,
   the fifth condition is set for the image orientation specifying section to specify that the long side of the first original placement section is perpendicular to the top or bottom side of the original,
   the control section causes an image of one original to be rotated by 90 degrees in a clockwise direction when the first condition and the second condition are satisfied before the image of one original is disposed in the predetermined layout,
   the control section causes an image of one original to be rotated by 90 degrees in a counterclockwise direction when the first condition and the third condition are satisfied before the image of one original is disposed in the predetermined layout,
   the control section causes an image of one original to be rotated by 90 degrees in the clockwise direction when the fourth condition and the second condition are satisfied before the image of one original is disposed in the predetermined layout, and the control section causes an image of one original to be rotated by 90 degrees in the clockwise direction when the fourth condition and the fifth condition are satisfied before the image of the one original is disposed in the predetermined layout.

2. The copying apparatus as claimed in claim 1, wherein the image read section reads the image by scanning.

3. The copying apparatus as claimed in claim 2, wherein a scanning direction, which is parallel with the orientation of the short side of the original, of the image read section when an original is placed in the first original placement section differs from a scanning direction, which is parallel with the orientation of the short side of the original, of the image read section when an original is placed in the second original placement section.

4. The copying apparatus as claimed in claim 2, wherein a subscanning direction of the image read section parallel with the orientation of the long side of the original when the original is placed in the first original placement section is opposite to a subscanning direction of the image read section parallel with the orientation of the long side of the original when the original is placed in the second original placement section.

5. The copying apparatus as claimed in claim 1, wherein the image read section reads the images of a plurality of originals while scaling down the images at a predetermined scaling factor and the control section causes the image formation section to form the images of the plurality of originals read by the image read section on one side of one recording medium in a predetermined layout.

6. The copying apparatus as claimed in claim 1, wherein the control section scales down the images of the plurality of originals read by the image read section at a predetermined scaling factor and causes the image formation section to form the images on one side of one recording medium in a predetermined layout.

7. The copying apparatus as claimed in claim 1, wherein the control section selectively causes the image formation section to form the images of two originals read by the image read section on one side of one recording medium in a predetermined layout and causes the image formation section to form the images of four originals read by the image read section on one side of one recording medium in a predetermined layout.

8. The copying apparatus as claimed in claim 7, wherein when a plurality of originals are transported in order from the first original placement section by the feeder and the control section causes the image formation section to form the images of two originals read by the image read section on one side of one recording medium in the predetermined layout, the control section rotates the two images in a different direction depending on whether the top and bottom orientations of the two images are parallel with the long side or the short side of the original, and causes the image formation section to form the rotated two images on one side of one recording medium.

9. The copying apparatus as claimed in claim 7, wherein when a plurality of originals are placed in the second original placement section in order and the control section causes the image formation section to form the images of two originals read by the image read section on one side of one recording medium in the predetermined layout, the control section rotates the two images in the same direction regardless of whether the top and bottom orientations of the two images are parallel with the long side or the short side of the original, and causes the image formation section to form the rotated two images on one side of one recording medium.

10. The copying apparatus as claimed in claim 7, wherein when a plurality of originals are transported in order from the first original placement section by the feeder and the control section causes the image formation section to form the images of four originals read by the image read section on one side of one recording medium in the predetermined layout, the control section does not rotate the four images regardless of whether the top and bottom orientations of the four images are parallel with the long side or the short side of the original, and causes the image formation section to form the four images on one side of one recording medium.

11. The copying apparatus as claimed in claim 7, wherein when a plurality of originals are placed in the second original placement section in order and the control section causes the image formation section to form the images of four originals read by the image read section on one side of one recording medium in the predetermined layout, if the top and bottom orientations of the four images are parallel with the long side of the original, the control section does not rotate the four images and causes the image formation section to form the four images on one side of one recording medium and if the top and bottom orientations of the four images are parallel with the short side of the original, the control section rotates the four images 180° and causes the image formation section to form the rotated four images on one side of one recording medium.

12. A method of operating a copying apparatus including an image read unit to read an image from an original having a long side and a short side placed in a first original placement section or a second original placement section with a predetermined orientation, an image formation unit to form the image on a recording medium, a detection unit, an image orientation specifying unit and a control unit, the method comprising the steps of:

detecting step of detecting which of the first and second original placement sections the original is placed in;

specifying step of specifying whether the top and bottom orientation of the image of the original is in parallel with the long side of the original or in parallel with the short side of the original;

reading step of reading the image from the original; and forming step of forming images of a plurality of originals read by the reading step on one side of one recording medium in a predetermined layout based on a detection result by the detecting step and a specification by the specifying step, wherein:

the forming step forms images of two originals read by the reading step on one side of one recording medium in a predetermined order and in a predetermined layout based on a plurality of conditions, the plurality of conditions including a first condition, a second condition, a third condition, a fourth condition and fifth condition, the first condition is set for the detecting step to detect that the original is read from the first original placement section, the second condition is set for the specifying step to specify that a long side of the first original placement section is parallel with a top or bottom side of the original, the third condition is set for the specifying step to specify that the long side of the original is perpendicular to a top or bottom side of the first original placement section, the fourth condition is set for the detecting step to detect that the original is read from the second original placement section, and the fifth condition is set for the specifying step to specify that the long side of the first original placement section is perpendicular to the top or bottom side of the original, the forming step includes:

rotating an image of one original by 90 degrees in a clockwise direction when the first condition and the second condition are satisfied before the image of the one original is disposed in the predetermined layout, rotating an image of one original by 90 degrees in a counterclockwise direction when the first condition and the third condition are satisfied before the image of one original is disposed in the predetermined layout, rotating an image of one original by 90 degrees in the clockwise direction when the fourth condition and the second condition are satisfied before the image of one original is disposed in the predetermined layout, and rotating an image of one original by 90 degrees in the clockwise direction when the fourth condition and the fifth condition are satisfied before the image of one original is disposed in the predetermined layout.

13. The method according to claim 12, wherein the forming step includes forming the images of two originals read by the reading step on one side of one recording medium in a predetermined layout and forming the images of four originals read by the reading step on one side of one recording medium in a predetermined layout.

14. The method according to claim 13, wherein the forming step includes rotating the images of originals read by the reading step and forming the images on one side of one recording medium in a predetermined layout based on the detection result, the specification and the number of images to be formed on the one recording medium.

15. The method according to claim 14, wherein the reading step includes reading the image from the original while scaling down the image at a predetermined scaling factor.

16. The method according to claim 14, wherein the forming step includes scaling down the images of the originals read by the reading step at a predetermined scaling factor.

17. A copying apparatus for copying an image read from an original having a long side and a short side to a recording medium, the copying apparatus comprising:

a first original placement section with a predetermined orientation of the long and short sides of the original to be placed;

a second original placement section with a predetermined orientation of the long and short sides of the original to be placed;

a feeder that transports the original from the first original placement section;

an image read section that reads the image from the original that has been placed on the first original placement section while the image read section is moved relative to the original and from the original that has been transported from the second original placement section while the image read section is stationary;

a storage section that stores data of the image read by the image read section:

a detection section that detects which of the first and second original placement sections the original is placed in;

an image orientation specifying section that specifies whether the top and bottom orientation of the image of the original placed in the first or second original placement section is in parallel with the long side of the original or in parallel with the short side of the original;

an image formation section that forms the image on the recording medium; and a control section that controls the image formation section, wherein:

the control section causes an image formation section to form images of four originals read by the image read section on one side of one recording medium in a predetermined order and in a predetermined layout based on a plurality of conditions, the plurality of conditions including a first condition, a second condition, a third condition, a fourth condition and a fifth condition, the first condition is set for the detection section to detect that the original is read from the first original placement section, the second condition is set for the image orientation specifying section to specify that a long side of the first original placement section is parallel with a top or bottom side of the original, the third condition is set for the image orientation specifying section to specify that the long side of the first original placement section is perpendicular to the top or bottom side of the original, the fourth condition is set for the detection section to detect that the original is read from the second original placement section, and the fifth condition is set for the image orientation specifying section to specify that the long side of the first original placement section is perpendicular to the top or bottom side of the original, the control section causes an image of one original not to be rotated when the first condition and the second condition are satisfied before the image of one original is disposed in the predetermined layout, the control section causes an image of one original not to be rotated when the first condition and the third condition are satisfied before the image of one original is disposed in the predetermined layout, the control section causes an image of one original not to be rotated when the fourth condition and the second condition are satisfied before the image of one original is disposed in the predetermined layout, and the control section causes an image of one original to be rotated by 180 degrees in a clockwise direction when the fourth condition and the fifth condition are satisfied before the image of one original is disposed in the predetermined layout.

18. The copying apparatus as claimed in claim 17:

wherein the image read section reads the image by scanning.

19. The copying apparatus as claimed in claim 18, wherein a scanning direction, which is parallel with the orientation of the short side of the original, of the image read section when an original is placed in the first original placement section differs from a scanning direction, which is parallel with the orientation of the short side of the original, of the image read section when an original is placed in the second original placement section.

20. The copying apparatus as claimed in claim 18, wherein a subscanning direction of the image read section parallel with the orientation of the long side of the original when the original is placed in the first original placement section is opposite to a subscanning direction of the image read section parallel with the orientation of the long side of the original when the original is placed in the second original placement section.

21. The copying apparatus as claimed in claim 17, wherein the image read section reads the images of a plurality of originals while scaling down the images at a predetermined scaling factor and the control section causes the image formation section to form the images of the plurality of originals read by the image read section on one side of one recording medium in a predetermined order.

22. The copying apparatus as claimed in claim 17, wherein the control section scales down the images of the plurality of originals read by the image read section at a predetermined scaling factor and causes the image formation section to form the images on one side of one recording medium in a predetermined layout.

23. The copying apparatus as claimed in claim 17,
wherein the control section selectively causes the image formation section to form images of two originals read by the image read section on one side of one recording medium in a predetermined layout and causes the image formation section to form the images of four originals read by the image read section on one side of one recording medium in a predetermined layout.

24. The copying apparatus as claimed in claim 23,
wherein when a plurality of originals are transported in order from the first original placement section by the feeder and the control section causes the image formation section to form the images of two originals read by the image read section on one side of one recording medium in the predetermined layout, the control section rotates the two images in a different direction depending on whether the top and bottom orientations of the two images are parallel with the long side or the short side of the original, and causes the image formation section to form the rotated two images on one side of one recording medium.

25. The copying apparatus as claimed in claim 23,
wherein when a plurality of originals are placed in the second original placement section in order and the control section causes the image formation section to form the images of two originals read by the image read section on one side of one recording medium in the predetermined layout, the control section rotates the two images in the same direction regardless of whether the top and bottom orientations of the two images are parallel with the long side or the short side of the original, and causes the image formation section to form the rotated two images on one side of one recording medium.

26. The copying apparatus as claimed in claim 23,
wherein when a plurality of originals are transported in order from the first original placement section by the feeder and the control section causes the image formation section to form the images of four originals read by the image read section on one side of one recording medium in the predetermined layout, the control section does not rotate the four images regardless of whether the top and bottom orientations of the four images are parallel with the long side or the short side of the original, and causes the image formation section to form the four images on one side of one recording medium.

27. The copying apparatus as claimed in claim 23,
wherein when a plurality of originals are placed in the second original placement section in order and the control section causes the image formation section to form the images of four originals read by the image read section on one side of one recording medium in the predetermined layout, if the top and bottom orientations of the four images are parallel with the long side of the original, the control section does not rotate the four images and causes the image formation section to form the four images on one side of one recording medium and if the top and bottom orientations of the four images are parallel with the short side of the original, the control section rotates the four images 180 degrees and causes the image formation section to form the rotated four images on one side of one recording medium.

28. A method of operating a copying apparatus including an image read unit to read an image from an original having a long side and a short side placed in a first original placement section or a second original placement section with a predetermined orientation, an image formation unit to form the image on a recording medium, a detection unit, an image orientation specifying unit and a control unit, the method comprising the steps of:
   detecting step of detecting which of the first and second original placement sections the original is placed in;
   specifying step of specifying whether the top and bottom orientation of the image of the original is in parallel with the long side of the original or in parallel with the short side of the original;
   reading step of reading the image from the original; and
   forming step of forming images of a plurality of originals read by the reading step on one side of one recording medium in a predetermined layout based on a detection result by the detecting step and a specification by the specifying step,
   wherein:
   the forming step forms images of four originals read by the reading step on one side of one recording medium in a predetermined order and in a predetermined layout based on a plurality of conditions, the plurality of conditions including a first condition, a second condition, a third condition, a fourth condition and a fifth condition,
   the first condition is set for the detecting step to detect that the original is read from the first original placement section,
   the second condition is set for the specifying step to specify that a long side of the first original placement section is parallel with a top or bottom side of the original,
   the third condition is set for the specifying step to specify that the long side of the first original placement section is perpendicular to the top or bottom side of the original,
   the fourth condition is set for the detecting step to detect that the original is read from the second original placement section, and
   the fifth condition is set for the specifying step to specify that the long side of the first original placement section is perpendicular to the top or bottom side of the original,
   the forming step includes:
   not rotating an image of one original when the first condition and the second condition are satisfied before the image of one original is disposed in the predetermined layout,
   not rotating an image of one original when the first condition and the third condition are satisfied before the image of one original is disposed in the predetermined layout,
   not rotating an image of one original not to be rotated when the fourth condition and the second condition are satisfied before the image of one original is disposed in the predetermined layout, and
   rotating an image of one original by 180 degrees in a clockwise direction when the fourth condition and the fifth condition are satisfied before the image of the one original is disposed in the predetermined layout.

29. The method according to claim 28,
wherein the forming step includes forming images of two originals read by the reading step on one side of one recording medium in a predetermined layout and forming the images of four originals read by the reading step on one side of one recording medium in a predetermined layout.

30. The method according to claim 29,
wherein the forming step includes rotating the images of originals read by the reading step and forming the images on one side of one recording medium in a predetermined layout based on the detection result, the specification and the number of images to be formed on the one recording medium.

31. The method according to claim 30, wherein the reading step includes reading the image from the original while scaling down the image at a predetermined scaring factor.

32. The method according to claim 30, wherein the forming step includes scaling down the images of the originals read by the reading step at a predetermined scaling factor.

* * * * *